C. S. Hall — Thresher Concave.

No. 117410 — Patented Jul 25 1871

Witnesses:
A. F. Sargent
D. L. Johnston

Inventor:
Chas. S. Hall
By W. S. Loughborough
Attys Rochester N.Y.

UNITED STATES PATENT OFFICE.

CHARLES S. HALL, OF ROCHESTER, NEW YORK.

IMPROVEMENT IN CONCAVES FOR THRASHING-MACHINES.

Specification forming part of Letters Patent No. 117,410, dated July 25, 1871.

*To all whom it may concern:*

Be it known that I, CHARLES S. HALL, of Rochester, in the county of Monroe and State of New York, have invented certain Improvements in Concaves for Thrashing-Machines, of which the following is a specification:

The object of my invention is chiefly to prevent heads of grain from passing unshelled through the thrasher and into the straw; and it consists more particularly in providing a concave with a depression or depressions between the tooth-ribs, against the ledges of which the headings lodge for an instant, being immediately after caught by the cylinder-teeth and shelled, and the beards, if any, broken from the kernels.

Figure 1:
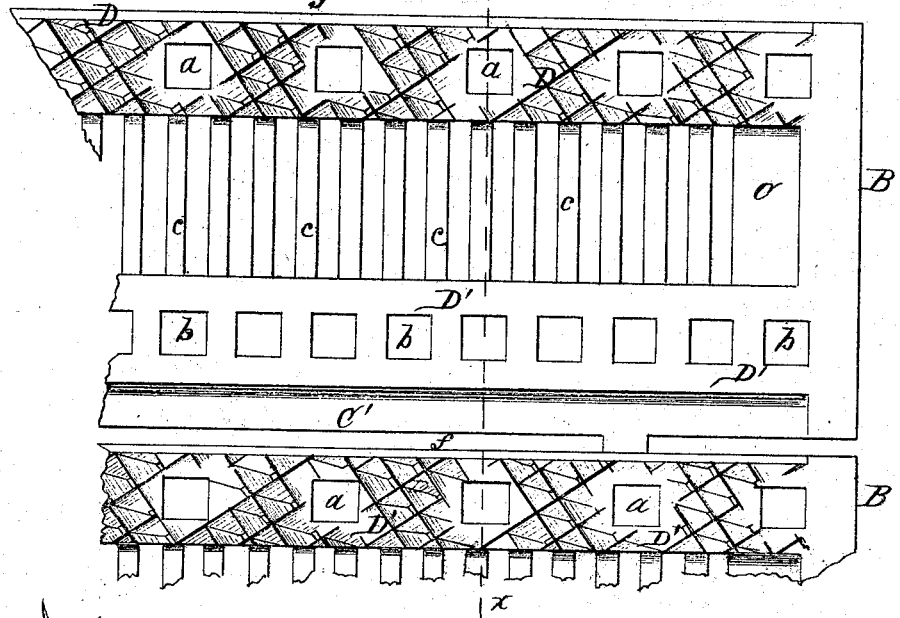
Figure 2:
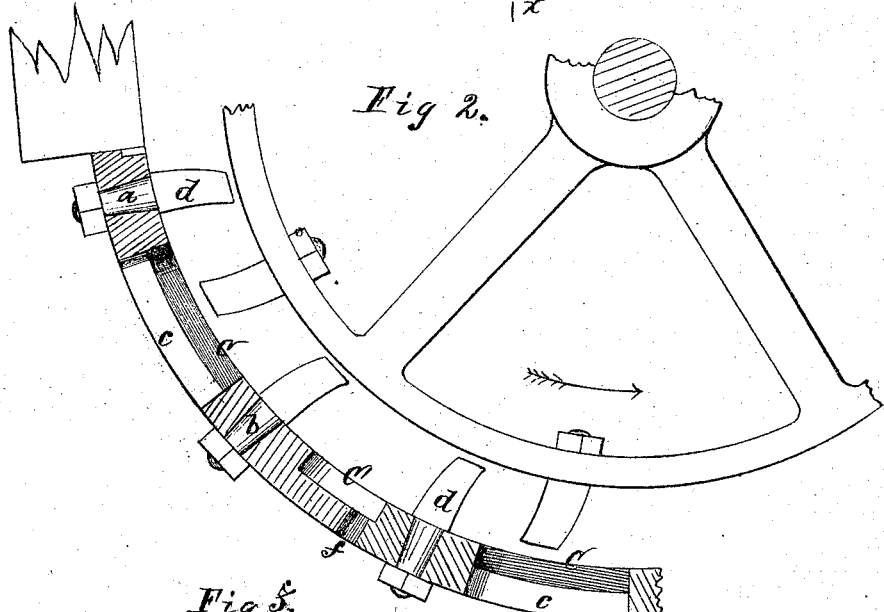

In the drawing, Figure 1 is a plan view of a portion of a concave constructed according to my improved plan. Fig. 2 is a transverse section at the dotted line $x$, Fig. 1, showing also a segment of the thrashing-cylinder.

The concave is preferably made in sections B, which are secured in grooves or ways upon the frame of the machine, as is usual in the undershot thrasher. The apertures $ab$, Fig. 1, receive the teeth $d$, Fig. 2, in the usual manner, and a grating, $c$, is provided between the longitudinal rows of teeth, through which the grain falls, as it is shelled, upon the carrier-apron below, not shown.

As heretofore generally constructed this grating has been upon the same general line with the face of the concave, and, as a consequence, the heads of grain that were broken off by the action of the teeth were projected over the concave in a direct line to the straw-carrier and the grain in them lost.

To obviate this difficulty I prefer locating the grating $c$ somewhat below the face of the ribs D and D′ holding the teeth, by which recesses or depressions C are formed over them, as clearly shown in Fig. 2. The headings gather in these depressions against the edges of the tooth-bars D and D′ and pile up, till caught by the cylinder-teeth and shelled, against the next row of teeth in the concave. Similar depressions C′ are also provided in the edge of the section B of the concave, a space, $f$, being formed between the consecutive sections to permit the passage of the grain. I have also found it preferable, in the construction of this form of concave, to provide apertures in the second rib D′, Fig. 1, of sections B, for double the number of teeth that is in the first rib D. By this means the headings cannot pass from the depressions C without being entirely shelled, and this construction is especially desirable in thrashing certain kinds of grain, such as barley and some varieties of wheat. The ribs D and D′, to which the teeth are attached, are adjusted very near to the extremity of the cylinder-teeth, as is usual in this class of machines, and the face of one or both of the bars in each section is serrated diagonally, as shown, the projections being pyramidal in form, either leaning or vertical, as may be found desirable. These serrations tend to change the direction of the straw and headings while passing the teeth, whereby, instead of being projected directly forward past the concave, they shoot off diagonally and are struck by the other teeth of the cylinder and shelled. The serrations also act to catch and retain headings till they are shelled by the cylinder-teeth.

Figure 3:
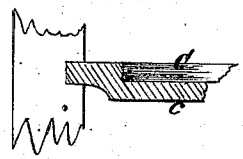

In order to render this form of concave applicable to machines already in use, the ends of the sections, where they enter the grooves prepared for them in the frame of the machine, are offset, as shown in Fig. 3, allowing the gratings to drop below the general line of the upper face, as before described.

It will be observed that my improved concave is as readily and cheaply constructed as the old form, and in practice I find its operation much more perfect and satisfactory.

All the teeth in the double row D′ not being necessary for ordinary work, every alternate one may be removed, as circumstances may require.

What I claim as my invention is—

A concave for thrashing-machines, constructed as herein described, consisting of the section or sections B, having the depressed longitudinal bars forming the grating $c$, and ledges D D′ corrugated upon their upper surfaces, as shown, and provided with apertures $a\,b$ for the insertion of removable teeth $d$, substantially as and for the purpose specified and set forth.

CHAS. S. HALL.

Witnesses:
F. H. CLEMENT,
C. H. CLARK.